(12) United States Patent  (10) Patent No.: US 6,229,630 B1
Kim  (45) Date of Patent: May 8, 2001

(54) SCANNING APPARATUS AND METHOD FOR DETERMINING SHEET SIZE OF PRINT MEDIUM

(75) Inventor: Hae-Chul Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/092,267

(22) Filed: Jun. 5, 1998

(30) Foreign Application Priority Data

Jun. 5, 1997 (KR) .................................................. 97-23197

(51) Int. Cl.[7] ................................. H04N 1/04; H04N 1/38
(52) U.S. Cl. ........................... 358/488; 358/474; 358/444; 358/464; 358/487; 358/498
(58) Field of Search ..................................... 358/499, 453, 358/488, 494, 496, 474, 497, 471, 464, 465, 487, 498; 382/203, 210; 399/367, 377, 378

(56) References Cited

U.S. PATENT DOCUMENTS

| | | |
|---|---|---|
| 5,060,281 | 10/1991 | Ohnishi . |
| 5,379,127 * | 3/1993 | Ando et al. ............................ 358/448 |
| 5,625,469 * | 6/1995 | Wheeler et al. ...................... 358/487 |
| 5,699,165 | 12/1997 | Suzuki et al. . |
| 5,760,412 * | 2/1996 | Yung et al. ........................ 250/559.4 |
| 5,786,590 * | 4/1997 | Lin et al. ........................... 250/208.1 |
| 5,949,922 * | 10/1997 | Wada et al. ........................... 382/295 |
| 5,973,797 * | 10/1999 | Tanaka et al. ........................ 358/488 |

\* cited by examiner

*Primary Examiner*—Cheukfan Lee
(74) *Attorney, Agent, or Firm*—Robert E. Bushnell, Esq.

(57) ABSTRACT

A sheet-size-determining device in a scanner, includes: a sheet carrier, having a pattern formed across the entire surface thereof, for holding (loading) a sheet of printed medium; a paper feeding device for controlling the feeding operation of the sheet carrier; a shuttle scanner module for scanning image data of the sheet of printed medium and outputting the scanned image data; a carriage return motor for driving the shuttle scanner module; an image memory for temporarily storing the scanned image data output from the shuttle scanner module; and a controller for analyzing the temporarily stored image data and outputs a control signal to the carriage return motor according to the analysis. The sheet carrier includes a background panel having a pattern formed thereon and a transparent flap connected to the background panel along one edge thereof.

20 Claims, 5 Drawing Sheets

SCANNING APPARATUS AND METHOD FOR DETERMINING SHEET SIZE OF PRINT MEDIUM

CLAIM OF PRIORITY

This application makes reference to, incorporates the same herein, and claims all benefits accruing under 35 U.S.C. §119 from my application entitled *Document Size Determining Device and Method for a Scanner* filed with the Korean Industrial Property Office on Jun. 5, 1997 and there duly assigned Serial No. 97-23197 by that Office.

BACKGROUND OF THE INVENTION

1. Field of the Invention

This invention relates to an image scanner and, more particularly, to an apparatus and method for accurately determining the actual sheet size (area) of a print medium, by which sheets smaller than standard size can be scanned using a sheet carrier.

2. Discussion of Related Art

Along with recent trends in multimedia technology, common computer peripheral devices, e.g., printers, have begun to incorporate facsimile and scanner functions into desktop computer systems. Meanwhile, it is often desired to process the images of non-standard size sheets of print medium such as a business card or photograph.

In scanning images printed on sheets of print medium below A4 size, the scanning area beyond the print medium's boundaries is typically either a white (reference) panel or a black panel such as a sheet carrier or other opaque mechanical structure. The white panel, however, routinely becomes contaminated with ink during the printing operation, so that the scanning of these areas is merely bypassed and the unscanned area is processed as free data. Thus, the white panel is rendered ineffective as a background.

The black panel (or blank area of a sheet carrier), on the other hand, is regarded as image data and scanned normally, resulting in the processing of useless data. This unnecessarily increases the scanning time, while placing undue data storage requirements on the scanner's hardware and slowing any subsequent image data processing.

U.S. Pat. Nos. 5,699,165 and 5,060,281 have disclosed scanner technologies aimed at solving these problems. Neither of these references, however, satisfy current industry needs.

SUMMARY OF THE INVENTION

Accordingly, in order to overcome such drawbacks in the conventional art, it is therefore an object of the present invention to provide a scanning method in which scanning time is reduced when scanning relatively small (i.e., less than maximum size) sheets of print medium, e.g., paper.

It is another object of the present invention to provide a scanning method which reduces the amount of data to be scanned, when scanning relatively small (i.e., less than maximum size) sheets of print medium, e.g., paper.

It is yet another object of the present invention to provide an apparatus for realizing the above scanning method.

To achieve these and other advantages and in accordance with the purpose of the present invention, as embodied and broadly described, there is provided a sheet-size-determining device in a scanner, having a sheet carrier, with a pattern formed across the entire surface thereof, for holding a sheet of printed medium; a paper feeding device for controlling the feeding operation of the sheet carrier; a shuttle scanner module for scanning image data of the sheet of printed medium and outputting the scanned image data; a carriage return motor for driving the shuttle scanner module; an image memory for temporarily storing the scanned image data output from the shuttle scanner module; and a controller for analyzing the temporarily stored image data and outputting a control signal to the carriage return motor according to the analysis.

According to another aspect of the present invention, there is also provided a method for determining the sheet size of a print medium, having the steps of: scanning a block of the print medium using a shuttle scanning module; temporarily storing the scanned block in an image memory; analyzing the stored block in order to recognize a pattern within the scanned block; and limiting an operating range of the shuttle scanner module if a pattern is recognized in the analyzing step.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

Figure 4:
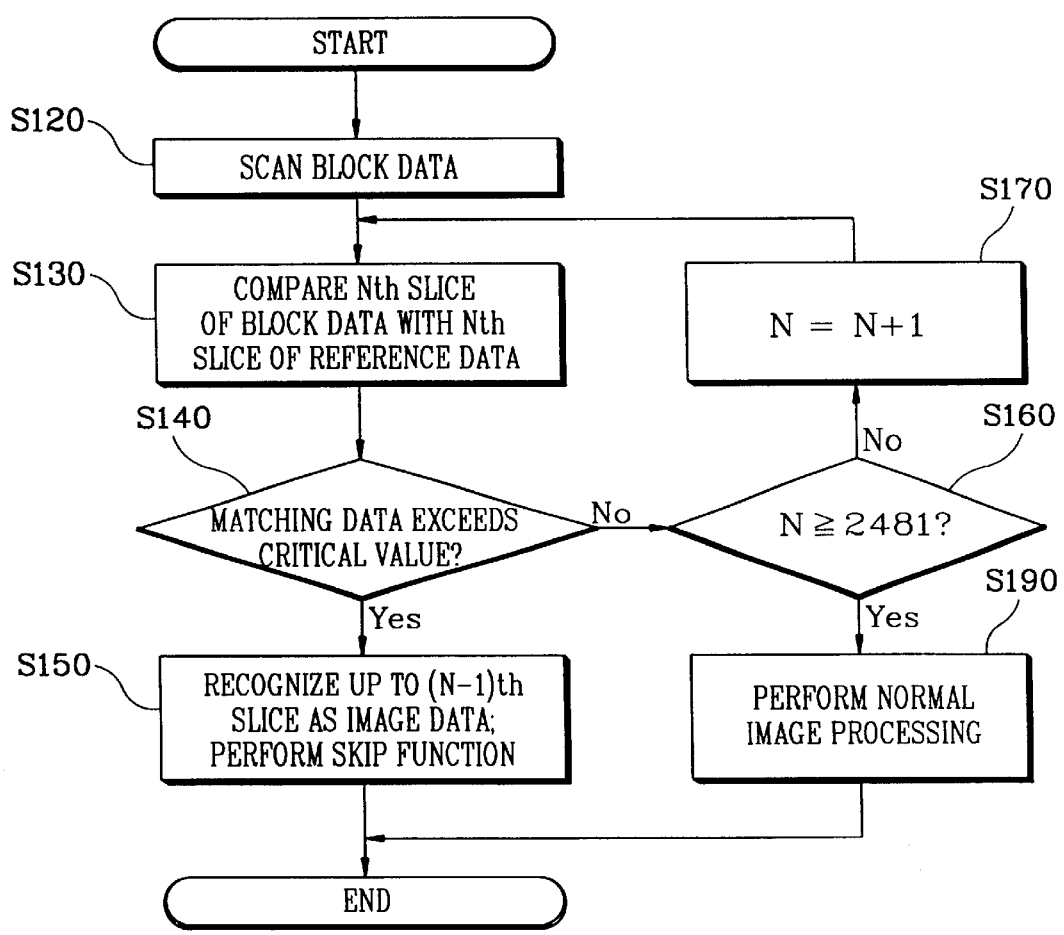
Figure 5:
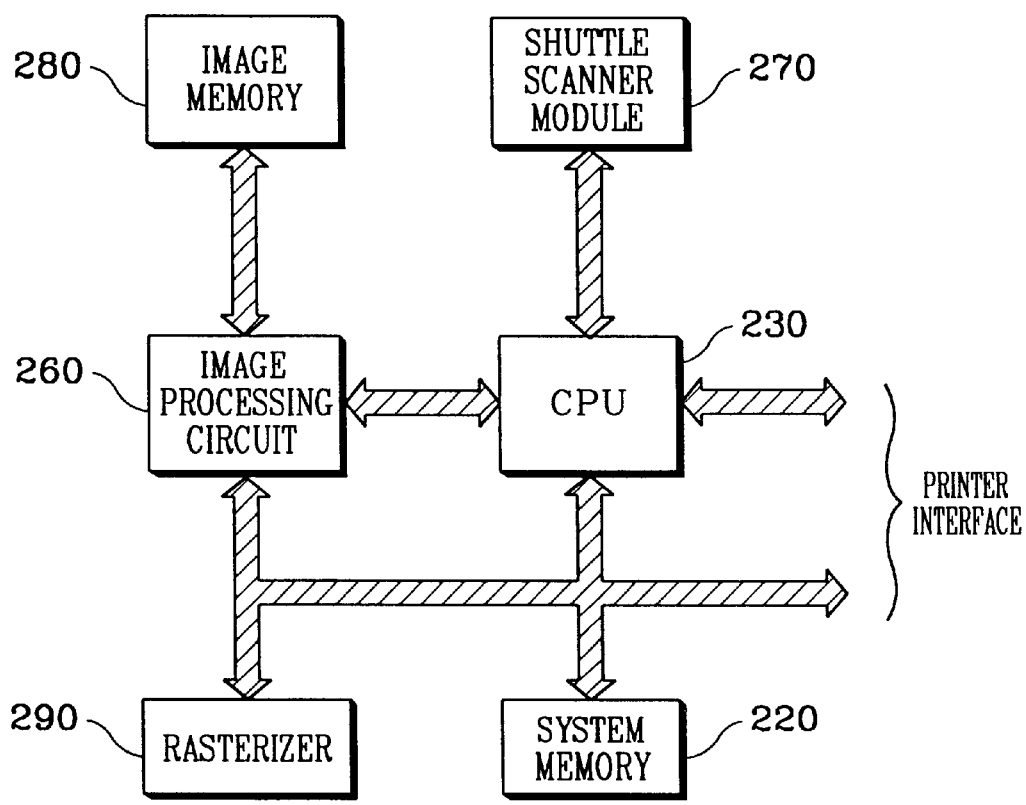

FIG. 4 in a flow chart showing a method for scanning a smaller-than-standard size print medium, according to the present invention; and FIG. 5 is a block diagram of a scanning apparatus adopting the principles of the present invention.

DETAILED DESCRIPTION OF THE PREFERRED EMBODIMENT

Figure 1:
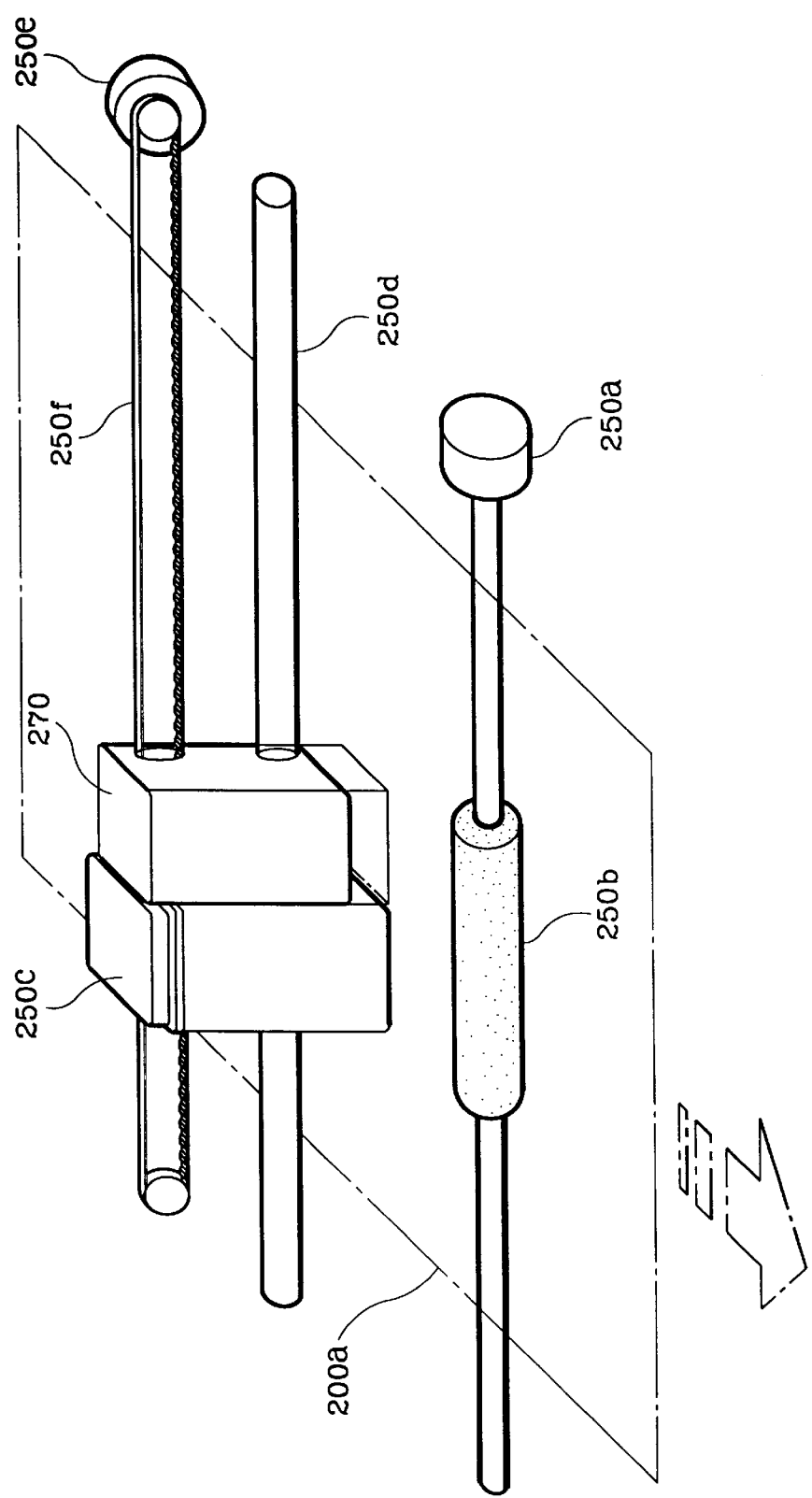
FIG. 1 is a perspective view of portions of a scanner adopting the principles of the present invention.
Figure 2:
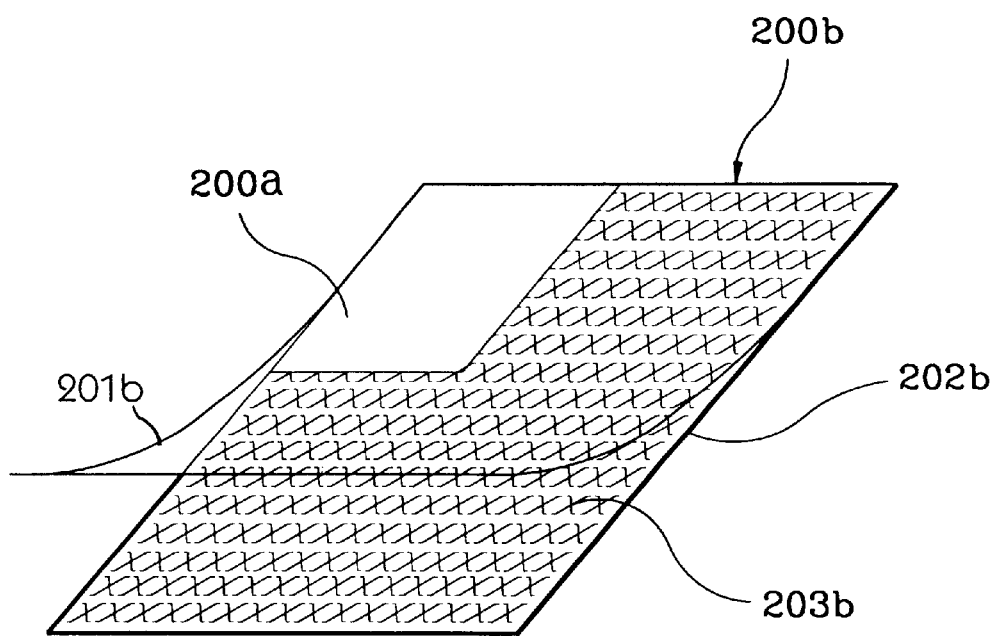
FIG. 2 is an operational perspective view of the sheet carrier shown in FIG. 1.

As shown in FIGS. 1 and 2, the scanning apparatus of the present invention has a sheet carrier 200*b* having a reference pattern 203*b* formed on a white background panel 202*b* and covered with a transparent flap 201*b* made of a plastic film connected to the white background panel 202*b* at one edge thereof in a hinge-like manner, a line feed (LF) motor 250*a* for generating a sheet-feeding force with a rotating LF roller 250*b* which feeds the sheet carrier 200*b*, and a shuttle scanner module 270 for performing a scanning operation by shuttling back and forth along a guide shaft 250*d* according to the operation of a carriage return (CR) motor 250*e* which drives a timing belt 250*f* being fixed at one point to the shuttle scanner module 270. A print head 250*c* for performing a printing operation by jetting ink is mounted adjacent the shuttle scanner module 270 and, being likewise fixed at one point to the timing belt 250*f*, is simultaneously moved along the guide shaft 250*d*. The CR and LF motors 250*e* and 250*a* respectively control the traveling distance of the shuttle scanner module 270 and the relative position of a printed medium 200*a* according to its size.

Figure 3A:
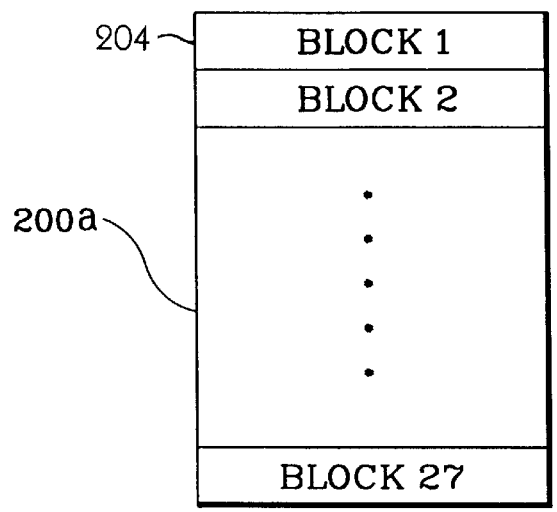
FIG. 3A is a diagram showing the blocks of an A4-sized sheet of print medium being scanned according to the method of the present invention.
Figure 3B:
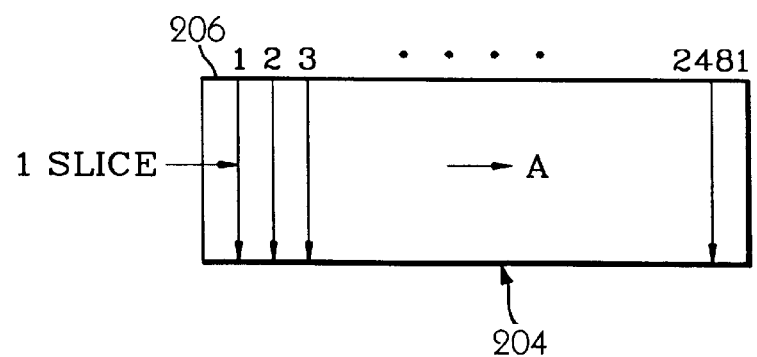
FIG. 3B is a diagram showing the slices of a block illustrated in FIG. 3A.

As shown in FIGS. 3A and 3B, the scanning method divides an assumed A4-size print medium into twenty-seven shuttle blocks 204 which are scanned under a resolution of 300 dpi (dots per inch), with each block 204 being subdivided into 2,481 slices 206. While traveling in the "A" direction, the shuttle scanner module 270 begins scanning one block.

Referring to FIG. 4, the scanning method of the present invention has a step S120 for scanning the first block of the printed medium 200a, a step S130 for comparing the Nth slice of the first block of image data with the Nth slice of stored reference data in order to determine the amount of identical (matching) data, a step S140 for determining whether the matching data is above a critical value, a step S150 which recognizes up to the (N–1)th slice as image data if the matching data is above the critical value and thereafter performs a scanning-skip process corresponding to unscanned data, a step S160 for determining whether the Nth slice is beyond the 2481st slice if the matching data is not above the critical value, a step S170 which increments the slice number until the slice number reaches 2481, and a step S190 for performing normal image processing when the slice number reaches 2481.

Referring to FIG. 5, a system memory 220 stores a control program of the scanner, preset (default) control data, and the pattern 203b of the sheet carrier 200b. A CPU 230 loads the stored data and control program and controls the feeding of the sheet carrier 200b into the scanning position of the shuttle scanner module 270 through the LF motor 250a and the LF roller 250b. The printed medium 200a is mounted in the sheet carrier 200b and fed to the scanning position, and width of the sheet is scanned by the shuttle scanner module 270 driven by the LF motor 250a and the timing belt 250f. An image processing circuit 260 performs shading, gamma correction, DPI (dots per inch) transformation, edge emphasis, and error diffusion for the scanned image data. The image data thus processed is stored in an image memory 280 in accordance with the operation of a rastorizer 290 that arranges the vertically scanned slices as serial image data for efficient storage.

The following is a more detailed description of the scanning method of the present invention.

As the printed medium 200a is fed, the first block thereof is scanned and processed (S120). The CPU 230 compares the processed data from the image processing circuit 260 with the reference pattern 203b of the sheet carrier 200b stored in the system memory 220 (S130). According to the result of the comparisons it is determined whether a critical degree of sameness exists between the scanned Nth slice of the printed medium 200a and the Nth slice of the reference pattern 203b, i.e., the stored reference data (S140). If sameness is determined, the (N–1)th slice, i.e., that immediately preceding the Nth slice, is recognized as actual data, after which the data processing is skipped so that only the image data is scanned. That is, the image data beyond the Nth slice is processed as white data (null data) and the traveling distance of the shuttle scanner module 270 is equal to the width of the print medium. If, on the other hand, the comparison results in a determination that the scanned image data differs from the reference pattern 203b, it is determined whether the Nth slice is beyond the 2481st slice, i.e., occurs past the last slice of a block (S160). If the scanned slice is determined to not be past the last slice of the block, the slice number is incremented and the process returns to step S130 to thereby compare the next slice with the reference data. If the incremented (next) slice matches that of the reference data, the scanning-skip process is performed again. Once the 2481st slice (i.e., maximum scanning width) is reached, the print medium 200a is scanned according to a normal scanning method as its size is recognized as equal to the maximum scanning area.

As described above, in scanning a sheet of print medium (e.g., paper) which is smaller in size than the maximum scanning area of a scanning apparatus, the apparatus and method of the present invention does not scan (skips) the outlying area of a print medium, but instead performs a skip function by detecting a recognizable pattern formed on a background panel of a sheet carrier. Accordingly, scan time is reduced and the scanning and processing of unnecessary image data is avoided, to thereby reduce the data storage requirements of a scanner.

It will be apparent to those skilled in the art that various modifications can be made in the scanning apparatus and method for determining the sheet size of a print medium of the present invention, without departing from the spirit of the invention. Thus, it is intended that the present invention cover such modifications as well as variations thereof, within the scope of the appended claims and their equivalents.

What is claimed is:

1. A sheet-size-determining device in a scanner, comprising:
   a sheet carrier, having a pattern formed across the entire surface of said sheet carrier, holding a sheet of printed medium;
   a paper feeding device controlling the feeding operation of said sheet carrier, said paper feeding device moving the sheet of printed medium along a length of said sheet carrier;
   a shuttle scanner module scanning image data of the sheet of printed medium and outputting said scanned image data;
   a carriage return motor driving said shuttle scanner module back and forth transversely across a width of said sheet carrier;
   a first memory storing reference data corresponding to the pattern formed on said sheet carrier;
   a second memory storing first scanned image data from said shuttle scanner module; and
   a controller discriminating a size of the sheet of printed medium by a comparison of said first scanned image data stored in said second memory and said referenced data stored in said first memory, outputting a control signal to said carriage return motor according to the comparison, moving said shuttle scanner module within a distance relating to a size of the sheet of printed medium.

2. The device of claim 1, further comprising an image processing circuit connected with said controller performing at least one of shading, gamma correction, dots per inch transformation, edge emphasis, and error diffusion of said image data before making said comparison.

3. The device of claim 1, with said controller determining the sheet size of the printed medium on the basis of whether said first scanned image data matches said reference data said first scanned image data matching said reference data corresponding to a region on said sheet carrier where said shuttle scanner module stops scanning across said sheet carrier and returns to a starting point.

4. The device of claim 3, further comprising a print head mounted adjacent to said shuttle scanner module moving simultaneously with said shuttle scanner module along a shaft, said print head accommodating a printing operation by jetting ink.

5. The device of claim 3, with said first scanned image data corresponding to a single lateral scan by said shuttle scanner module across the width of said sheet carrier, said first scanned image data being divided into a plurality of sections with each one of said sections corresponding to a location on said sheet carrier, said comparison being made in seriatim of said section of said first scanned image data with the corresponding sections of said reference data until either one of a last section being compared or a first section having a critical degree of sameness in said first scanned image data existing.

6. The device of claim 5, with the first section having a critical degree of sameness allowing all prior sections of first scanned image data to be recognized as actual data accommodating further image processing and all sections beyond the first section being processed as null data allowing travel distance of said shuttle scanner module equal to a width of said print medium.

7. The device of claim 1, with said controller comparing by determining whether a critical degree of sameness exists between a section of said first scanned image data and a corresponding section of said reference data.

8. An apparatus, comprising:
a sheet carrier holding a sheet of printed medium;
a background panel covering an entire top surface of said sheet carrier and having a pattern formed across an entire surface of said background panel, said background panel covering the sheet of printed medium;
a transparent flap made of a plastic film connected to said background panel along one edge of said transparent flap;
a paper feeding device controlling transport of said sheet carrier relative to said apparatus, said paper feeding device moving the sheet of printed medium longitudinally along a length of said sheet carrier;
a shuttle scanner module scanning image data from the sheet of printed medium;
a carriage return motor driving said shuttle scanner module transversely back and forth across a width of said sheet carrier;
a system memory storing reference data corresponding to said patterns said reference data being divided into a plurality of sections with each one of the sections corresponding to a different location on said background panel;
an image memory accommodating temporary storage of said image data from said shuttle scanner module, said image data being divided into a plurality of sections with each one of said sections corresponding to a different location on said background panel; and
a controller determining the sheet size of the printed medium by making a comparison between said image data with said reference data and outputting a control signal to said carriage return motor in accordance with said comparison, said shuttle scanner module not scanning a region of said background panel corresponding to said image data matching with said reference data.

9. The apparatus of claim 4, with the pattern formed on said background panel being repetitive.

10. The apparatus of claim 9, further comprising a print head mounted adjacent to said shuttle scanner module moving simultaneously with said shuttle scanner module along a shaft, said print head accommodating a printing operation.

11. The apparatus of claim 9, with said controller comparing by determining whether a critical degree of sameness exists between one of said sections of said image data and a corresponding section of said reference data.

12. The apparatus of claim 8, with said sections of said image data being grouped into a block, said block covering an entire width of the surface of said background panel, a plurality of blocks covering the entire surface of said background panel, said comparison being made sequentially by order of the sections of the block of said image data until either one of a last section is compared or a first section having a critical degree of sameness in said image data is recognized.

13. The apparatus of claim 12, with the first section having a critical degree of sameness allowing all prior sections of image data to be recognized as actual data accommodating further image processing and all sections including and beyond the first section being processed as null data allowing travel distance of said shuttle scanner module equal to a width of said print medium.

14. A method of determining the sheet size of a print medium, comprising the steps of:
storing reference data corresponding to a pattern formed across an entire surface of a sheet carrier in a first memory;
positioning said print medium on the surface of said sheet carrier above said pattern;
scanning a first block of the surface of said sheet carrier with said print medium using a shuttle scanner module;
storing said first scanned block in a second memory;
comparing automatically said stored first scanned block from said second memory with a corresponding reference data in said first memory; and
limiting an operating range of the shuttle scanner module if said pattern is recognized in said comparing step.

15. The method of claim 14, with said comparing step, a traveling distance corresponding to a slice of said first scanned block whose scanned data value matches stored reference data being recognized as the sheet size of said print medium.

16. The method of claim 15, with scanned data beyond the recognized size of the print medium being processed as null data.

17. The method of claim 14, with said comparing step further comprising the steps of:
stopping comparison of said first scanned block when a section of said reference data matches a corresponding section of said first scanned block;
recognizing all sections of second memory as actual data before the section of said reference data matches the corresponding section of said first scanned block; and
processing all sections of said first scanned block beyond and including the recognized matching section as null data accommodating no further image processing.

18. The method of claim 17, further comprising the steps of:
stopping comparison of said first scanned block when the last section of said reference data is reached and no matching data is recognized; and
performing image processing on all sections of said first scanned block of said second memory.

19. The method of claim 18, with a print head being mounted adjacent to said shuttle scanner module moving simultaneously with said shuttle scanner module along a shaft, said print head accommodating a printing operation by jetting ink.

20. The method of claim 19, with said comparing by said controller being made by determining whether a critical degree of sameness exists between a section of said first scanned block data and a corresponding section of said reference data.

* * * * *